United States Patent
Pan et al.

(10) Patent No.: US 12,436,014 B2
(45) Date of Patent: Oct. 7, 2025

(54) METERING METHOD BASED ON GAS VOLUME FRACTION FITTING FOR WET NATURAL GAS

(71) Applicants: Haimo Subsea Technology (Shanghai) co., Ltd., Shanghai (CN); CNOOC CHINA LIMITED, SHANGHAI BRANCH, Shanghai (CN)

(72) Inventors: Yanzhi Pan, Shanghai (CN); Hailin Xue, Shanghai (CN); Yi Zhang, Shanghai (CN); Huamin Xiao, Shanghai (CN); Xichun Liu, Shanghai (CN)

(73) Assignees: Haimo Subsea Technology (Shanghai) co., Ltd., Shanghai (CN); CNOOC CHINA LIMITED, SHANGHAI BRANCH, Shanghai (CN)

( * ) Notice: Subject to any disclaimer, the term of this patent is extended or adjusted under 35 U.S.C. 154(b) by 0 days.

(21) Appl. No.: 18/694,431

(22) PCT Filed: Apr. 20, 2023

(86) PCT No.: PCT/CN2023/089557
§ 371 (c)(1),
(2) Date: Mar. 26, 2024

(87) PCT Pub. No.: WO2024/093158
PCT Pub. Date: May 10, 2024

(65) Prior Publication Data
US 2025/0130087 A1    Apr. 24, 2025

(30) Foreign Application Priority Data
Nov. 3, 2022 (CN) .......................... 202211365421.5

(51) Int. Cl.
*G01F 1/88* (2006.01)
*G01F 1/74* (2006.01)

(52) U.S. Cl.
CPC . *G01F 1/88* (2013.01); *G01F 1/74* (2013.01)

(58) Field of Classification Search
CPC .................................... G01F 1/88; G01F 1/74
(Continued)

(56) References Cited

U.S. PATENT DOCUMENTS 5,576,495 A    11/1996   Vetterick
6,612,187 B1    9/2003   Lund
(Continued)

FOREIGN PATENT DOCUMENTS

CN           1963403 A      5/2007
CN         201032456 Y      3/2008
(Continued)

*Primary Examiner* — Peter J Macchiarolo
*Assistant Examiner* — Rodney T Frank
(74) *Attorney, Agent, or Firm* — Bayramoglu Law Offices LLC

(57) ABSTRACT

A metering method based on gas volume fraction fitting for wet natural gas is provided. The method includes fitting relationships between a gas Froude number and Venturi differential pressure and Venturi pressure loss with known data to obtain a gas Froude number calculation formula; dividing the known data according to a size of the gas Froude number; fitting relationships between a gas volume fraction and the Venturi differential pressure and the Venturi pressure loss in sections to obtain a piecewise gas volume fraction calculation formula under different gas Froude numbers; and acquiring, on the basis of the gas Froude number calculation formula and the piecewise gas volume fraction calculation formula, some necessary real-time data to calculate a real-time flow rate of the wet gas. The method avoids the use of a ray flow meter. The advantages of the (Continued)

method include accurate metering, small errors and no radioactive pollution.

12 Claims, 2 Drawing Sheets

(58) Field of Classification Search
USPC ..................................................... 73/861.42
See application file for complete search history.

(56) References Cited

U.S. PATENT DOCUMENTS

2005/0193832 A1  9/2005  Tombs et al.
2008/0000306 A1  1/2008  Agar et al.
2019/0390988 A1  12/2019  Rovner

FOREIGN PATENT DOCUMENTS

| CN | 110514257 A | 11/2019 |
| CN | 114444343 A | 5/2022 |
| CN | 114877963 A | 8/2022 |
| CN | 115420342 A | 12/2022 |

METERING METHOD BASED ON GAS VOLUME FRACTION FITTING FOR WET NATURAL GAS

CROSS REFERENCE TO THE RELATED APPLICATIONS

This application is the national phase entry of International Application No. PCT/CN2023/089557, filed on Apr. 20, 2023, which is based upon and claims priority to Chinese Patent Application No. 202211365421.5, filed on Nov. 3, 2022, the entire contents of which are incorporated herein by reference.

TECHNICAL FIELD

The present disclosure relates to natural gas extraction engineering, and in particular to a flow metering method in a natural gas extraction process.

BACKGROUND

The state advocates carbon neutralization, strives to reach the peak value by 2030, and strives to realize carbon neutralization by 2060. Compared with petroleum, natural gas has the advantages of low carbon and high efficiency, is a cleaner energy source, and also an important transitional resource for realizing carbon neutralization in the future. The whole world has stepped up its efforts to extract natural gas.

A wet gas flow meter is an important apparatus for natural gas exploitation, which provides important real-time metering data for gas reservoir management and enhanced oil recovery. There are two main technologies for the wet gas flow meter, one is "Venturi+gamma ray" technology, and the other is "V-cone+gamma ray" technology. Both technologies require two metering methods to cooperate with each other, and integrate their respective data to calculate a flow rate of wet gas (gas and liquid two-phase flow).

However, although such two technologies are widely used, existing wet gas flow meters are limited in application in some areas due to safety regulatory issues for gamma radiation sources, and therefore, it is necessary to develop a wet gas flow metering technology of the non-ray technology.

As the mature prior art, the basic principle of the Venturi metering technology is shown in FIG. 1. Venturi differential pressure $DP_1$ is measured by taking pressure (2 and 3) at the upstream portion and the throat of a Venturi tube respectively, Venturi pressure loss PL is measured by taking pressure at the upstream portion and downstream portion of the Venturi tube respectively. When wet gas flows in the Venturi tube, the pressure decreases first and then recovers, as shown in FIG. 2.

SUMMARY OF THE INVENTION

In view of the above reasons, the present disclosure provides a metering method based on gas volume fraction fitting for wet natural gas, which only performs wet gas metering based on a basic Venturi flow meter and gets rid of dependence on a ray flow meter. In practical application, the metering method has the advantages of accurate metering, small errors and no radioactive pollution, and has practical application value and significance.

The main technical solutions employed by the present disclosure are implemented according to the following steps:

Firstly, fitting relationships between a gas Froude number and Venturi differential pressure and Venturi pressure loss with known data to obtain a gas Froude number calculation formula, which specifically includes the following steps:
step 1, acquiring a fitting array, where
the fitting array includes some one-to-one corresponding data including a gas Froude number Frg, Venturi pressure loss PL, Venturi differential pressure $DP_1$ and a gas volume fraction GVF; and
step 2, fitting relationships between the gas Froude number Frg and the Venturi pressure loss PL and Venturi differential pressure $DP_1$ according to Formula (1) as follows:

$$Frg = F(DP_3).\qquad\text{Formula (1)}$$

In the formula, $DP_3=DP_1-PL$, and
a gas Froude number calculation formula is obtained by means of fitting.

Then, dividing the known data according to a size of the gas Froude number, and fitting relationships between a gas volume fraction, and the Venturi differential pressure and the Venturi pressure loss in sections according to the section of the known data to obtain a piecewise gas volume fraction calculation formula under different gas Froude numbers, which specifically includes the following steps:
step 3, setting a division range according to a data size of the gas Froude number Frg, and dividing the fitting array into three sections, namely a high Frg section, a medium Frg section and a low Frg section; and
fitting, according to the section to which the fitting array belongs, relationships between the gas volume fraction GVF and the Venturi pressure loss PL and the Venturi differential pressure $DP_1$ in sections, as shown in Formula group (2) as follows, $$\begin{cases} GVF = f_1(k), & Frg > x_2; \\ GVF = f_2(k), & x_1 \le Frg \le x_2; \\ GVF = f_3(k), & Frg < x_1; \end{cases}\qquad\text{Formula group (2)}$$

In the formula group,
$x_1$, $x_2$ are both natural numbers, $x_1 < x_2$, and
$k = DP_1/DP_3$.
A piecewise gas volume fraction calculation formula is obtained by means of fitting.

Next, acquiring, on the basis of the gas Froude number calculation formula and the piecewise gas volume fraction calculation formula, some necessary real-time data to calculate a real-time flow rate of wet gas, which specifically includes the following step:
step 4, acquiring a calculation array of wet gas to be measured, where
the calculation array includes some one-to-one corresponding data including real-time Venturi pressure loss $PL^s$, real-time Venturi differential pressure $DP_1^s$, a real-time gas phase density $\rho_g$, and a real-time liquid phase density $\rho_l$.
A real-time $k^s$ value is calculated according to Formula (3) as follows:

$$k^s = \frac{DP_1^s}{DP_1^s - PL^s}.\qquad\text{Formula (3)}$$

A real-time $DP_3^s$ value is calculated according to Formula (4) as follows:

$$DP_3^s = DP_1^s - PL^s. \quad \text{Formula (4)}$$

After the above data is obtained, the real-time gas Froude number is obtained by using the real-time $DP_3^s$ data first, the section range of the real-time data is determined according to the size of the real-time gas Froude number on the basis of the same rule, and related data are plugged into the piecewise gas volume fraction calculation formula, so as to calculate the real-time gas volume fraction, which specifically includes the following step:

step 5, calculating a real-time gas volume fraction $GVF^s$, where
the real-time $DP_3^s$ value is plugged into the gas Froude number calculation formula obtained in step 2 to obtain a real-time gas Froude number $Frg^s$, the three values of $Frg^s$, $x_1$ and $x_2$ are compared, and the section to which the calculation array belongs is determined by taking the division range set in step 3 as a standard.

The real-time $k^s$ value is plugged into the corresponding section in the piecewise gas volume fraction calculation formula obtained in step 3 to calculate and obtain the real-time gas volume fraction $GVF^s$.

Finally, calculating a mixed density in combination with a real-time calibrated gas phase density and liquid phase density to obtain the real-time mass flow rate, which specifically includes the following step:

step 6, calculating a real-time mass flow rate $Q_{tp}$, according to Formula (5) as follows:

$$Q_{tp} = CEd^2 * \sqrt{DP_1^s/\rho_{mix}}. \quad \text{Formula (5)}$$

In the formula,
C, E are both constants, d represents a diameter of the throat of the Venturi, and $$\rho_{mix} = \rho_l * (1 - GVF^s) + \rho_g * GVF^s.$$

DETAILED DESCRIPTION OF THE EMBODIMENTS

Figure 1:
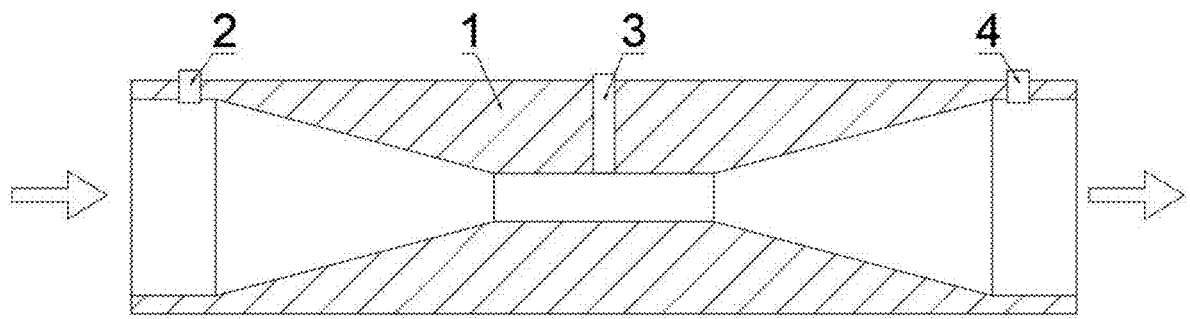
FIG. 1 is a schematic diagram of an internal structure of a Venturi tube.
Figure 2:
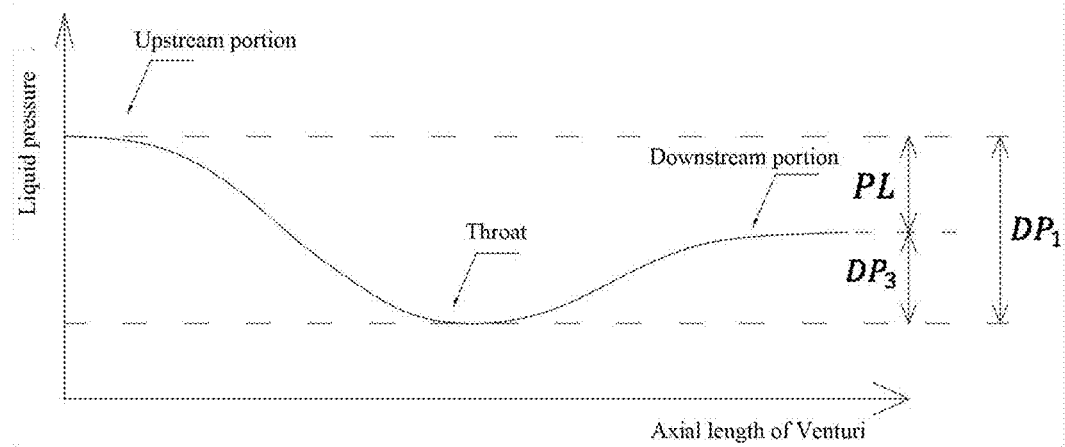
FIG. 2 is a schematic diagram of pressure changes during flowing of wet gas in a Venturi tube.

The present disclosure will be further described below with reference to the examples and the accompanying drawings.

Example 1

A metering method based on gas volume fraction fitting for wet natural gas is implemented according to the following steps:

step 1, acquire a fitting array, where
the fitting array includes some one-to-one corresponding data including a gas Froude number Frg, Venturi pressure loss PL, Venturi differential pressure $DP_1$ and a gas volume fraction GVF.

Step 2, fit the relationships between the gas Froude number Frg and the Venturi pressure loss PL and Venturi differential pressure $DP_1$ according to Formula (1) as follows:

$$Frg = F(DP_3). \quad \text{Formula (1)}$$

In the formula, $DP_3 = DP_1 - PL$, and
a gas Froude number calculation formula is obtained by means of fitting.

Step 3, set a division range according to a data size of the gas Froude number Frg, and divide the fitting array into three sections, namely a high Frg section, a medium Frg section and a low Frg section; and
fitting, according to the section to which the fitting array belongs, relationships between the gas volume fraction GVF and the Venturi pressure loss PL and the Venturi differential pressure $DP_1$ in sections, as shown in Formula group (2) as follows, $$\begin{cases} GVF = f_1(k), & Frg > x_2; \\ GVF = f_2(k), & x_1 \leq Frg \leq x_2; \\ GVF = f_3(k), & Frg < x_1; \end{cases} \quad \text{Formula group (2)}$$

In the formula group,
$x_1$, $x_2$ are both natural numbers, $x_1 < x_2$, and
$k = DP_1/DP_3$.
A piecewise gas volume fraction calculation formula is obtained by means of fitting.

Step 4, acquire a calculation array of wet gas to be measured, where
the calculation array includes some one-to-one corresponding data including real-time Venturi pressure loss $PL^s$, real-time Venturi differential pressure $DP_1^s$, a real-time gas phase density $\rho_g$, and a real-time liquid phase density $\rho_l$.

A real-time $k^s$ value is calculated according to Formula (3) as follows:

$$k^s = \frac{DP_1^s}{DP_1^s - PL^s}. \quad \text{Formula (3)}$$

A real-time $DP_3^s$ value is calculated according to Formula (4) as follows:

$$DP_3^s = DP_1^s - PL^s. \quad \text{Formula (4)}$$

Step 5, calculate a real-time gas volume fraction $GVF^s$, where the real-time $DP_3^s$ value is plugged into the gas Froude number calculation formula obtained in step 2 to obtain a real-time gas Froude number $Frg^s$, the three values of $Frg^s$, $x_1$ and $x_2$ are compared, and the section to which the calculation array belongs is determined by taking the division range set in step 3 as a standard.

The real-time $k^s$ value is plugged into the corresponding section in the piecewise gas volume fraction calculation formula obtained in step 3 to calculate and obtain the real-time gas volume fraction $GVF^s$.

Step 6, set the wet gas to be measured as homogeneous flow, and calculate a real-time mass flow rate $Q_{tp}$ according to Formula (5) as follows:

$$Q_{tp} = CEd^2 * \sqrt{DP_1^s/\rho_{mix}}. \quad \text{Formula (5)}$$

In the formula, $$E = \frac{\sqrt{2} \cdot \pi}{4\sqrt{1-\beta^4}}$$

$$\beta = d/D$$

C represents a Venturi outflow coefficient,
d represents a diameter of the throat of the Venturi, and
D represents a diameter of a straight tube section of a Venturi inlet.

$$\rho_{mix} = \rho_l * (1 - GVF^s) + \rho_g * GVF^s.$$

Example 2

This example differs from Example 1 only in that in step 3, specific fitting formulas of Formula group (2) are:

$$\begin{cases} GVF = f_1(k) = a_1 k^3 + b_1 k^2 + c_1 k + d_1, Frg > x_2; \\ GVF = f_2(k) = a_2 k^3 + b_2 k^2 + c_2 k + d_2, x_1 \le Frg \le x_2; \\ GVF = f_3(k) = a_3 k^3 + b_3 k^2 + c_3 k + d_3, Frg < x_1; \end{cases} \quad \text{Formula group (2)}$$

In the formula group, $a_1$, $a_2$, $a_3$, $b_1$, $b_2$, $b_3$, $c_1$, $c_2$, $c_3$, $d_1$, $d_2$, $d_3$ are all natural numbers, and specific parameters are obtained by fitting the gas volume fraction GVF, the Venturi pressure loss PL and the Venturi differential pressure $DP_1$. After a large number of corresponding k values and GVF values are plugged, values of $a_1$, $a_2$, $a_3$, $b_1$, $b_2$, $b_3$, $c_1$, $c_2$, $c_3$, $d_1$, $d_2$, $d_3$ are obtained.

Example 3

This example differs from Example 1 only in further including:
step 7, calculate a real-time gas phase mass flow rate $Q_g$ according to Formula (6) as follows:

$$Q_g = Q_{tp} * GVF^s. \quad \text{Formula (6)}$$

Step 8, calculate a real-time liquid phase mass flow rate $Q_l$ according to Formula (7) as follows:

$$Q_l = Q_{tp} * (1 - GVF^s). \quad \text{Formula (7)}$$

Example 4

This example differs from Example 1 only in that in step 2, the specific fitting formula of Formula (1) is:

$$Frg = F(DP_3) = a_4 * DP_3^3 + b_4 * DP_3^2 + c_4 * DP_3 + d_4. \quad \text{Formula (1)}$$

In the formula,
$a_4$, $b_4$, $c_4$, $d_4$ are natural numbers, and when a large number of corresponding and related gas Froude numbers Frg, Venturi pressure loss PL and Venturi differential pressure $DP_1$ corresponding are plugged into Formula (1), values of $a_4$, $b_4$, $c_4$, $d_4$ can be obtained.

Example 5

A metering method based on gas volume fraction fitting for wet natural gas is implemented according to the following steps:
step 1, acquire a fitting array, where
the fitting array includes some one-to-one corresponding data including a gas Froude number Frg, Venturi pressure loss PL, Venturi differential pressure $DP_1$ and a gas volume fraction GVF.
Step 2, fit the relationships between the gas Froude number Frg and the Venturi pressure loss PL and Venturi differential pressure $DP_1$ according to Formula (1) as follows:

$$Frg = F(DP_3) = a_4 * DP_3^3 + b_4 * DP_3^2 + c_4 * DP_3 + d_4. \quad \text{Formula (1)}$$

In Formula (1), $$DP_3 = DP_1 - PL,$$

$a_4$, $b_4$, $c_4$, $d_4$ are natural numbers, and when a large number of corresponding and related gas Froude numbers Frg, Venturi pressure loss PL and Venturi differential pressure $DP_1$ corresponding are plugged into Formula (1), values of $a_4$, $b_4$, $c_4$, $d_4$ can be obtained, thereby obtaining a gas Froude number calculation formula by means of fitting.
Step 3, set a division range according to a data size of the gas Froude number Frg, and divide the fitting array into three sections, namely a high Frg section, a medium Frg section and a low Frg section; and
fitting, according to the section to which the fitting array belongs, relationships between the gas volume fraction GVF and the Venturi pressure loss PL and the Venturi differential pressure $DP_1$ in sections, as shown in Formula group (2) as follows, $$\begin{cases} GVF = f_1(k) = a_1k^3 + b_1k^2 + c_1k + d_1, Frg > x_2; \\ GVF = f_2(k) = a_2k^3 + b_2k^2 + c_2k + d_2, x_1 \le Frg \le x_2; \\ GVF = f_3(k) = a_3k^3 + b_3k^2 + c_3k + d_3, Frg < x_1; \end{cases}$$ Formula group (2)

In Formula group (2), $x_1$, $x_2$ are both natural numbers, $x_1 < x_2$, and $k = DP_1/DP_3$.

$a_1$, $a_2$, $a_3$, $b_1$, $b_2$, $b_3$, $c_1$, $c_2$, $c_3$, $d_1$, $d_2$, $d_3$ are all natural numbers, and specific parameters are obtained by fitting the gas volume fraction GVF, the Venturi pressure loss PL and the Venturi differential pressure $DP_1$. After a large number of corresponding k values and GVF values are plugged, values of $a_1$, $a_2$, $a_3$, $b_1$, $b_2$, $b_3$, $c_1$, $c_2$, $c_3$, $d_1$, $d_2$, $d_3$ are obtained, and a piecewise gas volume fraction calculation formula can be obtained by means of fitting.

Supplementary description is made to step 3 with one example. For example, there are three fitting arrays as follows:

the first fitting array includes: a gas Froude number $Frg_1$, Venturi pressure loss $PL_1$, Venturi differential pressure $DP_{1,1}$ and a gas volume fraction $GVF_1$.

The second fitting array includes: a gas Froude number $Frg_2$, Venturi pressure loss $PL_2$, Venturi differential pressure $DP_{1,2}$ and a gas volume fraction $GVF_2$.

The third fitting array includes: gas Froude number $Frg_3$, Venturi pressure loss $PL_3$, Venturi differential pressure $DP_{1,3}$ and a gas volume fraction $GVF_3$.

After the division range of Frg is set:

For the first fitting array, $Frg > x_2$, which belongs to a high Frg section range.

For the second fitting array, $Frg \ge x_1$, and $Frg \le x_2$, which belongs to a medium Frg section range.

For the third fitting array, $Frg < x_1$, which belongs to a low Frg section range.

Therefore, during fitting:

the first fitting array should be fitted according to $GVF = f_1(k) = a_1k^3 + b_1k^2 + c_1k + d_1$, the second fitting array should be fitted according to $GVF = f_2(k) = a_2k^3 + b_2k^2 + c_2k + d_2$, and the third fitting array should be fitted according to $GVF = f_3(k) = a_3k^3 + b_3k^2 + c_3k + d_3$.

Certainly, during respective fitting of the three sections, enough data is required to so as to obtain the corresponding parameters.

Step 4, acquire a calculation array of wet gas to be measured, where the calculation array includes some one-to-one corresponding data including real-time Venturi pressure loss $PL^s$, real-time Venturi differential pressure $DP_1^s$, a real-time gas phase density $\rho_g$, and a real-time liquid phase density $\rho_l$.

A real-time $k^s$ value is calculated according to Formula (3) as follows:

$$k^s = \frac{DP_1^s}{DP_1^s - PL^s}.$$ Formula (3)

A real-time $DP_3^s$ value is calculated according to Formula (4) as follows:

$$DP_3^s = DP_1^s - PL^s.$$ Formula (4)

Step 5, calculate a real-time gas volume fraction $GVF^s$, where the real-time $DP_3^s$ value is plugged into the gas Froude number calculation formula obtained in step 2 to obtain a real-time gas Froude number $Frg^s$, the three values of $Frg^s$, $x_1$ and $x_2$ are compared, and the section to which the calculation array belongs is determined by taking the division range set in step 3 as a standard.

The real-time $k_S$ value is plugged into the corresponding section in the piecewise gas volume fraction calculation formula obtained in step 3 to calculate and obtain the real-time gas volume fraction $GVF^s$, which specifically includes the following situations:

When $Frg^s > x_2$, the calculation array belongs to the high Frg section range, and related data ($k^s$) should be plugged into $GVF = f_1(k) = a_1k^3 + b_1k^2 + c_1k + d_1$ to calculate the gas volume fraction (in this case, all parameters in the formula are known).

When $Frg \ge x_1$ and $Frg \le x_2$, the calculation array belongs to the medium Frg section range, and the related data ($k^s$) should be plugged into $GVF = f_2(k) = a_2k^3 + b_2k^2 + c_2k + d_2$ to calculate the gas volume fraction (in this case, all parameters in the formula are known).

When $Frg < x_1$, the calculation array belongs to the low Frg section range, and the related data ($k^s$) should be brought into $GVF = f_3(k) = a_3k^3 + b_3k^2 + c_3k + d_3$ to calculate the gas volume fraction (in this case, all parameters in the formula are known).

Step 6, set the wet gas to be measured as homogeneous flow, and calculate a real-time mass flow rate $Q_{tp}$ according to Formula (5) as follows:

$$Q_{tp} = CEd^2 * \sqrt{DP_1^s/\rho_{mix}}.$$ Formula (5)

In the formula, $$E = \frac{\sqrt{2} \cdot \pi}{4\sqrt{1-\beta^4}},$$

$$\beta = d/D,$$

C represents a Venturi outflow coefficient,
d represents a diameter of the throat of the Venturi, and
D represents a diameter of a straight tube section of a Venturi inlet.

$$\rho_{mix} = \rho_l * (1 - GVF^s) + \rho_g * GVF^s.$$

Step 7, calculate a real-time gas phase mass flow rate $Q_g$ according to Formula (6) as follows:

$$Q_g = Q_{tp} * GVF^s.$$ Formula (6)

Step 8, calculate a real-time liquid phase mass flow rate $Q_l$ according to Formula (7) as follows:

$$Q_l = Q_{tp} * (1 - GVF^s).$$ Formula (7)

Test Case:

A test is performed according to the method mentioned in Example 5.

1. Fitting Between Frg and $DP_3$

Fitting is performed on several gas Froude numbers Frg, Venturi pressure loss PL, and Venturi differential pressure $DP_1$, and $DP_3=DP_1-PL$.

Figure 3:
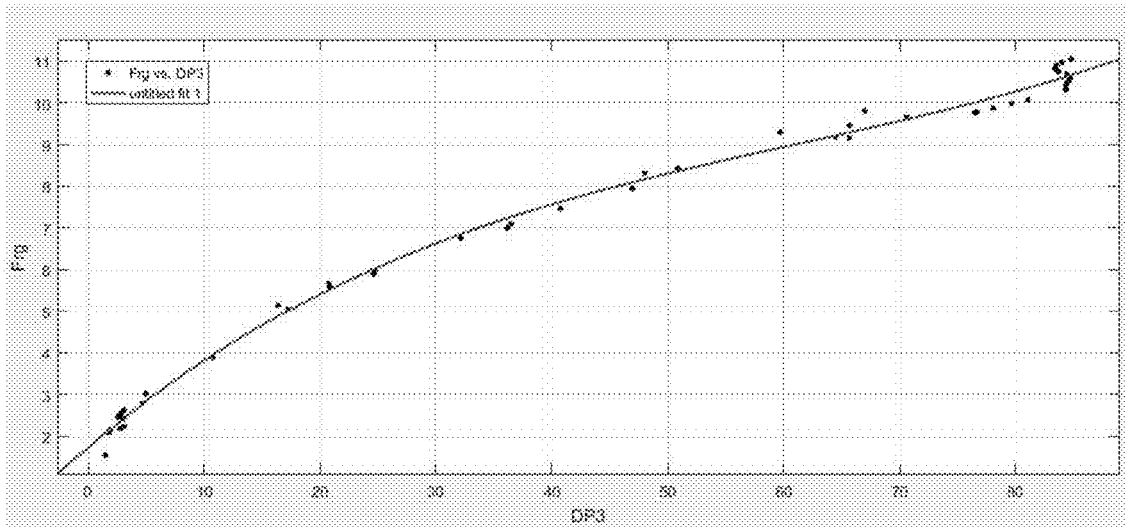
FIG. 3 is a $Frg$-$DP_3$ curve selected from a real-time fitting process in a test case.

Several coordinate points (Frg, $DP_3$) are obtained, which are distributed in a plane rectangular coordinate system as shown in FIG. 3. The relationship between Frg and $DP_3$ by means of fitting is:

$Frg=F(DP_3)=-5DP_3^3-0.002819DP_3^2+0.2341DP_3+1.728+1.534e$, and the corresponding degree of fitting is as follows: $R^2-0.996$.

2. Piecewise Fitting

According to experience, it is set that $x_1=3.500$ and $x_2=9.170$, and the division standard for the high Frg section is Frg>9.170;

the division standard for the medium Frg section is $3.500 \leq Frg \leq 9.170$; and the division standard for the low Frg section is Frg<3.500.

Figure 4:
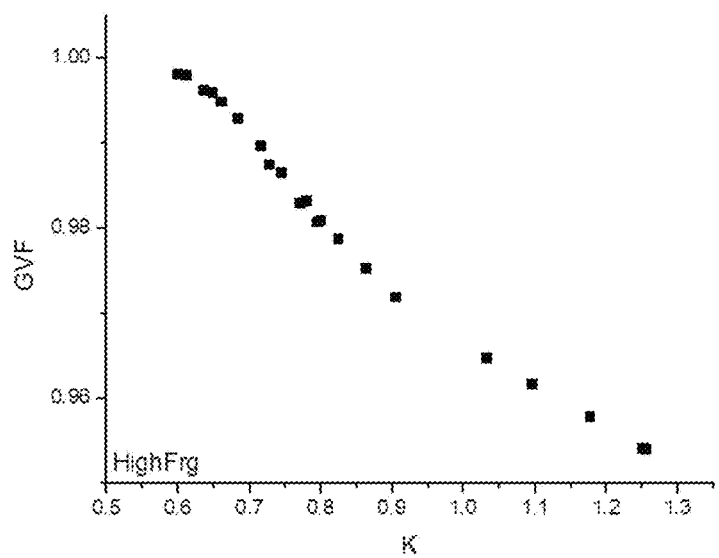
FIG. 4 is a GVF-k scatter diagram during fitting of a high Frg section in a test case.
Figure 5:
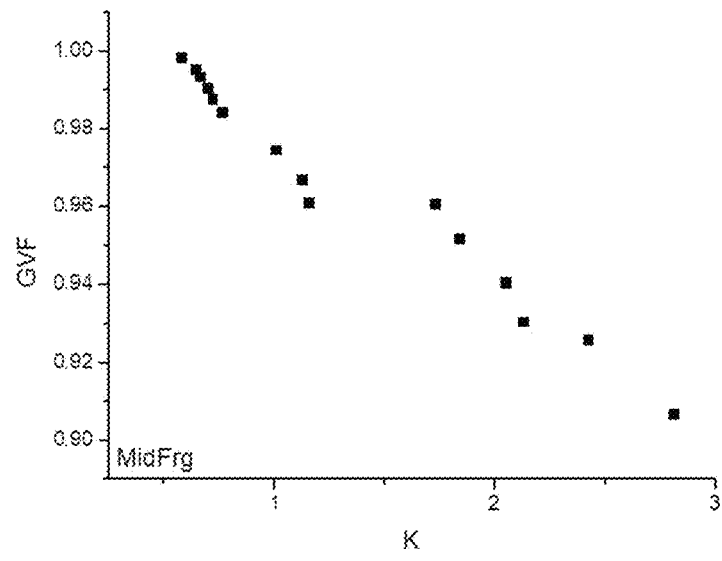
FIG. 5 is a GVF-k scatter diagram during fitting of a medium Frg section in a test case.
Figure 6:
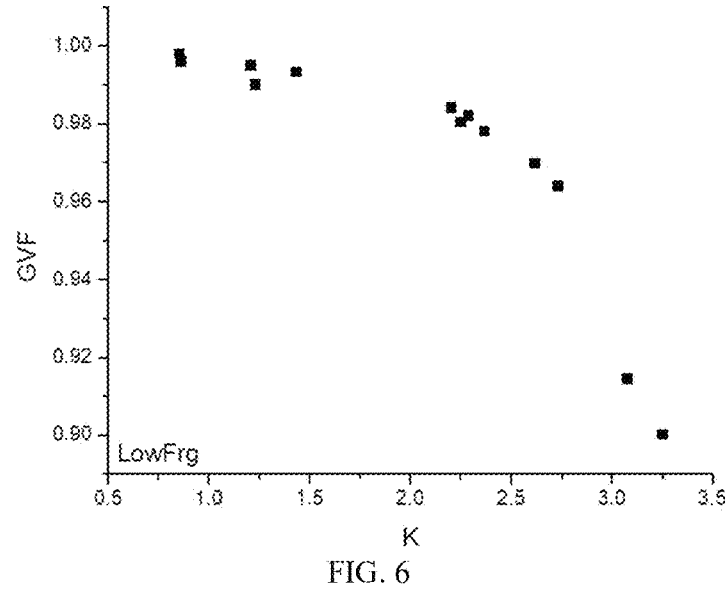
FIG. 6 is a GVF-k scatter diagram during fitting of a low Frg section in a test case.

Several coordinate points (GVF, k) are obtained by means of calculation, and coordinate points (GVF, k) of the high, medium and low Frg sections are distributed in the plane rectangular coordinate system, which are shown in FIG. 4, FIG. 5 and FIG. 6 respectively.

Piecewise fitting is performed on the coordinates (GVF, k) of each section to obtain:

$$\begin{cases} GVF = 0.01898k^3 + 0.002403k^2 - 0.1249k + 1.07, & Frg > 9.170 \\ GVF = -0.01227k^3 + 0.06275k^2 - 0.1334k + 1.057, & 3.500 \leq Frg \leq 9.170 \\ GVF = -0.01748k^3 + 0.07908k^2 - 0.1205k + 1.054, & Frg < 3.500 \end{cases}$$

The degrees of fitting, namely $R^2$, of the above three formulas are 0.997, 0.978 and 0.989 respectively.

3. Flow Metering

Real-time data of wet gas to be measured is acquired, and a real-time gas phase mass flow rate $Q_g$ and a real-time liquid phase mass flow rate $Q_l$ are calculated. Moreover, relative errors $Err_g$ and $Err_l$ are calculated respectively with real-time gas and liquid phase mass flow rates as reference. See Table 1 for statistical results.

Table 1 Statistical table for real-time gas and liquid phase mass flow rates and relative errors

| equisition point | $Q_g$ | $Err_g$ | $Q_l$ | $Err_l$ |
|---|---|---|---|---|
| 1 | 6.303 | 3.16% | 1.077 | −5.37% |
| 2 | 6.045 | −2.94% | 0.114 | −19.34% |
| 3 | 6.811 | −1.31% | 0.545 | 34.77% |
| 4 | 6.933 | −0.37% | 0.659 | 21.66% |
| 5 | 7.916 | −0.37% | 0.193 | −47.25% |
| 6 | 8.820 | 2.39% | 0.718 | −28.08% |
| 7 | 16.836 | −1.36% | 0.238 | −38.27% |
| 8 | 19.408 | 0.34% | 1.354 | −11.34% |
| 9 | 20.373 | 1.63% | 4.205 | 13.28% |
| 10 | 21.779 | 1.61% | 3.060 | −1.89% |
| 11 | 23.738 | −0.46% | 1.272 | −4.86% |
| 12 | 24.412 | 0.91% | 2.697 | −0.33% |
| 13 | 27.234 | 3.13% | 6.632 | 10.95% |
| 14 | 26.428 | −0.94% | 0.341 | −42.57% |
| 15 | 27.776 | 2.26% | 3.858 | −2.91% |
| 16 | 28.624 | 3.01% | 5.913 | 6.88% |
| 17 | 28.171 | 0.07% | 0.954 | −23.90% |
| 18 | 31.255 | 3.00% | 7.842 | 16.08% |
| 19 | 31.355 | 2.60% | 6.870 | 14.92% |
| 20 | 31.476 | 2.29% | 5.194 | 7.68% |
| 21 | 31.487 | 1.74% | 3.805 | 3.40% |
| 22 | 31.518 | 1.08% | 2.462 | −3.71% |
| 23 | 31.557 | 0.59% | 1.693 | −9.14% |
| 24 | 31.628 | 0.24% | 1.373 | −7.40% |
| 25 | 31.630 | −0.34% | 0.380 | −22.52% |

It can be seen from Table 1 that the relative error between the gas phase mass flow rate calculated by using the method of Example 5 and a true value is very small, and the relative error fluctuation of the liquid phase mass flow rate is relatively large. However, for metering of the wet gas (high gas volume fraction), the stable gas phase mass flow rate with a smaller error has practical guiding significance.

Beneficial effects: fitting is performed with known data by using the method of the present disclosure to obtain the gas volume fraction calculation formula. Then, virtual metering is performed in combination with pressure data measured by using a Venturi flow meter, gas-liquid density parameters of the wet gas, etc. to calculate flow data of the wet gas, and dependence on a ray flow meter is avoided. The advantages of accurate metering, small errors and no radioactive pollution are achieved.

Finally, it should be noted that the above description are merely preferred examples of the present disclosure. Under the inspiration of the present disclosure, those of ordinary skill in the art can make various similar representations without departing from the spirit and claims of the present disclosure, and such transformations fall within the protection scope of the present disclosure.

What is claimed is:

1. A flow metering method based on gas volume fraction fitting for wet natural gas, being implemented according to the following steps:

step 1, acquiring a fitting array, wherein
the fitting array comprises some one-to-one corresponding data comprising a gas Froude number Frg, Venturi pressure loss PL, Venturi differential pressure $DP_1$ and a gas volume fraction GVF;

step 2, fitting relationships between the gas Froude number Frg and the Venturi pressure loss PL and the Venturi differential pressure $DP_1$ according to Formula (1) as follows:

$$Frg = F(DP_3), \quad \text{Formula (1)}$$

$DP_3=DP_1-PL$, and
a gas Froude number calculation formula is obtained by means of fitting;

step 3, setting a division range according to a data size of the gas Froude number Frg, and dividing the fitting array into three sections, namely a high Frg section, a medium Frg section and a low Frg section;

fitting, according to the section to which the fitting array belongs, relationships between the gas volume fraction GVF and the Venturi pressure loss PL and the Venturi differential pressure $DP_1$ in sections, as shown in Formula group (2) as follows, $$\begin{cases} GVF = f_1(k), & Frg > x_2; \\ GVF = f_2(k), & x_1 \le Frg \le x_2; \\ GVF = f_3(k), & Frg < x_1; \end{cases} \quad \text{Formula group (2)}$$

wherein
$x_1$, $x_2$ are both natural numbers, $x_1 < x_2$,
$k = DP_1/DP_3$, and
a piecewise gas volume fraction calculation formula is obtained by means of fitting;

step 4, acquiring a calculation array of wet gas to be measured, wherein
the calculation array comprises some one-to-one corresponding data comprising real-time Venturi pressure loss $PL^s$, real-time Venturi differential pressure $DP_1^s$, a real-time gas phase density $\rho_g$, and a real-time liquid phase density $\rho_l$, wherein the method comprises measuring at least the real-time Venturi pressure loss $PL^s$ and the real-time Venturi differential pressure $DP_1^s$, with a Venturi flow meter,
a real-time $k^s$ value is calculated according to Formula (3) as follows:

$$k^s = \frac{DP_1^s}{DP_1^s - PL^s}; \quad \text{Formula (3)}$$

a real-time $DP_3^s$ value is calculated according to Formula (4) as follows:

$$DP_3^s = DP_1^s - PL^s; \quad \text{Formula (4)}$$

step 5, calculating a real-time gas volume fraction $GVF^s$, wherein
the real-time DPS value is plugged into the gas Froude number calculation formula obtained in step 2 to obtain a real-time gas Froude number $Frg^s$, the three values of $Frg^s$, $x_1$ and $x_2$ are compared, the section to which the calculation array belongs is determined by taking the division range set in step 3 as a standard, and
the real-time $k^s$ value is plugged into the corresponding section in the piecewise gas volume fraction calculation formula obtained in step 3 to calculate and obtain the real-time gas volume fraction $GVF^s$; and
step 6, calculating a real-time mass flow rate $Q_{tp}$ according to Formula (5) as follows:

$$Q_{tp} = CEd^2 * \sqrt{DP_1^s/\rho_{mix}}, \quad \text{Formula (5)}$$

wherein
C,E are both constants, d represents a diameter of the throat of the Venturi, and $$\rho_{mix} = \rho_l * (1 - GVF^s) + \rho_g * GVF^s.$$

2. The flow metering method based on gas volume fraction fitting for wet natural gas according to claim 1, wherein a real-time gas phase mass flow rate $Q_g$ is calculated according to Formula (6) as follows:

$$Q_g = Q_{tp} * GVF^s. \quad \text{Formula (6)}$$

3. The flow metering method based on gas volume fraction fitting for wet natural gas according to claim 2, wherein in step 3, the division range is artificially set.

4. The flow metering method based on gas volume fraction fitting for wet natural gas according to claim 2, wherein in step 6, wet gas to be measured is set to be gas homogeneous flow, and then, the real-time mass flow rate $Q_{tp}$ of the wet gas to be measured is calculated according to Formula (5).

5. The flow metering method based on gas volume fraction fitting for wet natural gas according to claim 1, wherein a real-time liquid phase mass flow rate $Q_l$ is calculated according to Formula (7) as follows:

$$Q_l = Q_{tp} * (1 - GVF^s). \quad \text{Formula (7)}$$

6. The flow metering method based on gas volume fraction fitting for wet natural gas according to claim 5, wherein in step 3, the division range is artificially set.

7. The flow metering method based on gas volume fraction fitting for wet natural gas according to claim 5, wherein in step 6, wet gas to be measured is set to be gas homogeneous flow, and then, the real-time mass flow rate $Q_{tp}$ of the wet gas to be measured is calculated according to Formula (5).

8. The flow metering method based on gas volume fraction fitting for wet natural gas according to claim 1, wherein in step 3, the relationships between the gas volume fraction GVF and the Venturi pressure loss PL and the Venturi differential pressure $DP_1$ is fitted in sections according to Formula group (2) as follows:

$$\begin{cases} GVF = f_1(k) = a_1k^3 + b_1k^2 + c_1k + d_1, & Frg > x_2; \\ GVF = f_2(k) = a_2k^3 + b_2k^2 + c_2k + d_2, & x_1 \le Frg \le x_2; \\ GVF = f_3(k) = a_3k^3 + b_3k^2 + c_3k + d_3, & Frg < x_1; \end{cases} \quad \text{Formula group (2)}$$

wherein
$a_{1,2,3}$, $b_{1,2,3}$, $c_{1,2,3}$ and $d_{1,2,3}$ are all natural numbers, and specific parameters are obtained by fitting the gas volume fraction GVF, the Venturi pressure loss PL and the Venturi differential pressure $DP_1$.

9. The flow metering method based on gas volume fraction fitting for wet natural gas according to claim 8, wherein in step 3, the division range is artificially set.

10. The flow metering method based on gas volume fraction fitting for wet natural gas according to claim 8, wherein in step 6, wet gas to be measured is set to be gas homogeneous flow, and then, the real-time mass flow rate $Q_{tp}$ of the wet gas to be measured is calculated according to Formula (5).

11. The flow metering method based on gas volume fraction fitting for wet natural gas according to claim 1, wherein in step 3, the division range is artificially set.

12. The flow metering method based on gas volume fraction fitting for wet natural gas according to claim 1, wherein in step 6, wet gas to be measured is set to be gas homogeneous flow, and then, the real-time mass flow rate $Q_{tp}$ of the wet gas to be measured is calculated according to Formula (5).

\* \* \* \* \*